(12) United States Patent
Mayer et al.

(10) Patent No.: US 11,159,340 B2
(45) Date of Patent: Oct. 26, 2021

(54) DATA STRUCTURE FOR THE TRANSFER OF DATA FROM A FIELDBUS NETWORK INTO A CLOUD

(71) Applicant: Endress+Hauser Process Solutions AG, Reinach (CH)

(72) Inventors: Michael Mayer, Oberwil (CH); Axel Pöschmann, Basel (CH)

(73) Assignee: Endress+Hauser Process Solutions AG, Reinach (CH)

( * ) Notice: Subject to any disclaimer, the term of this patent is extended or adjusted under 35 U.S.C. 154(b) by 0 days.

(21) Appl. No.: 16/652,092

(22) PCT Filed: Aug. 21, 2018

(86) PCT No.: PCT/EP2018/072522
§ 371 (c)(1),
(2) Date: Mar. 30, 2020

(87) PCT Pub. No.: WO2019/063202
PCT Pub. Date: Apr. 4, 2019

(65) Prior Publication Data
US 2020/0252236 A1    Aug. 6, 2020

(30) Foreign Application Priority Data

Sep. 28, 2017 (DE) ..................... 10 2017 122 621.4

(51) Int. Cl.
*H04L 12/40* (2006.01)
*G06F 16/9035* (2019.01)

(52) U.S. Cl.
CPC .... *H04L 12/40169* (2013.01); *G06F 16/9035* (2019.01); *H04L 2012/4026* (2013.01)

(58) Field of Classification Search
CPC ........... G06F 16/9035; H04L 12/40169; H04L 2020/4026
See application file for complete search history.

(56) References Cited

U.S. PATENT DOCUMENTS

2012/0151017 A1* 6/2012 Naismith .......... H04L 12/40169
709/220
2012/0303832 A1   11/2012 Raschke et al.
(Continued)

FOREIGN PATENT DOCUMENTS

| CN | 1570910 A | 1/2005 |
|---|---|---|
| CN | 101739304 A | 6/2010 |

(Continued)

*Primary Examiner* — Nimesh G Patel
(74) *Attorney, Agent, or Firm* — Kelly J. Smith; Endress+Hauser (USA) Holding Inc.

(57) ABSTRACT

A fieldbus network is described, which has at least one device as well as a connecting apparatus, wherein the connecting apparatus is designed to transfer data from the fieldbus network into a cloud. Installed in at least one of the devices is a derived class, which is derived from a predetermined head class, wherein head attributes are established by the predetermined head class and additional device specific attributes are established by the derived class, wherein the at least one of the devices is designed based on the derived class to produce a data object for the data transfer to the cloud. The connecting apparatus is designed to receive the data object of the device, to convert at least a part of the data contained in the data object into a format of an interface of the cloud and to write the data into the cloud.

17 Claims, 3 Drawing Sheets

(56) References Cited

U.S. PATENT DOCUMENTS

| | | | |
|---|---|---|---|
| 2016/0216706 A1* | 7/2016 | Christensen | G05B 19/41865 |
| 2017/0244791 A1* | 8/2017 | Ripplinger | H04L 67/12 |
| 2018/0167232 A1* | 6/2018 | Kaslin | H04L 12/66 |
| 2019/0258596 A1* | 8/2019 | Sotriffer | G05B 19/41845 |

FOREIGN PATENT DOCUMENTS

| | | |
|---|---|---|
| CN | 103314554 A | 9/2013 |
| CN | 104361457 A | 2/2015 |
| CN | 105824296 A | 8/2016 |
| DE | 102016101200 A1 | 7/2016 |

\* cited by examiner

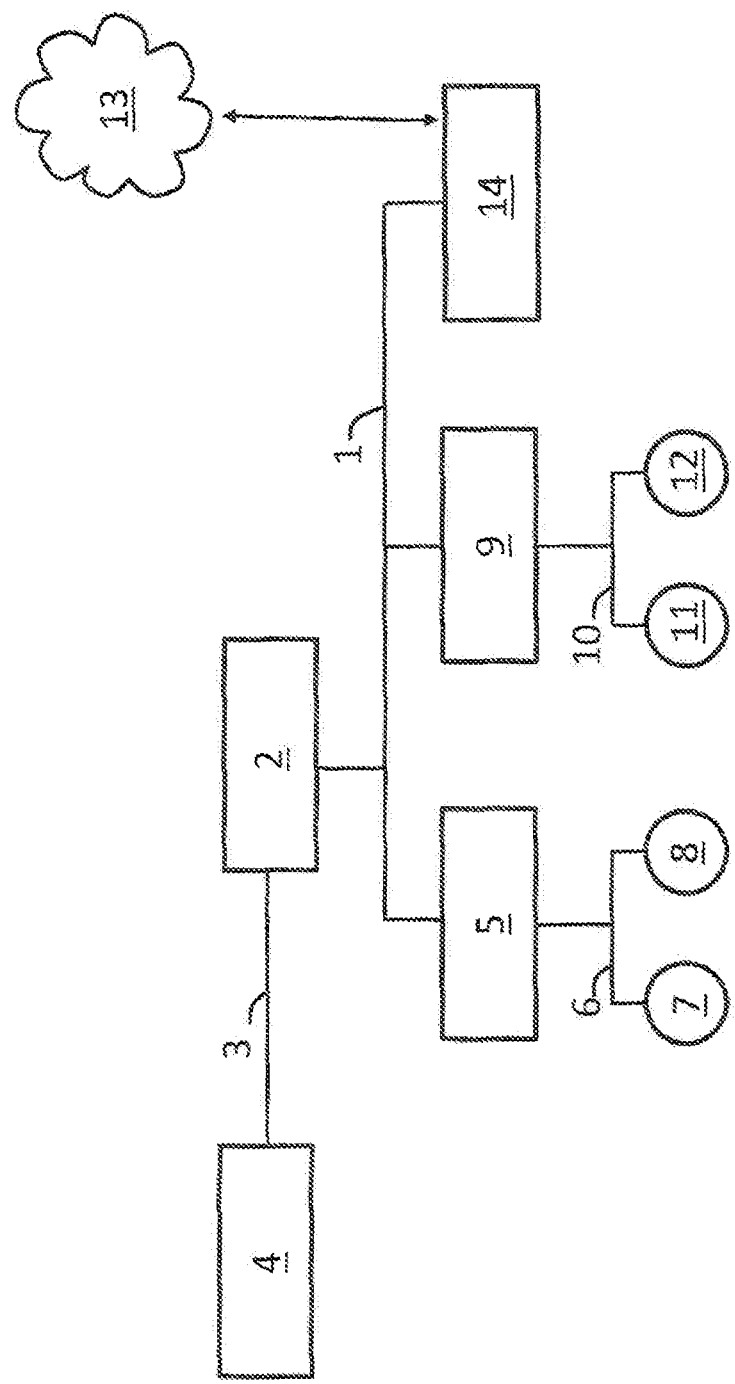

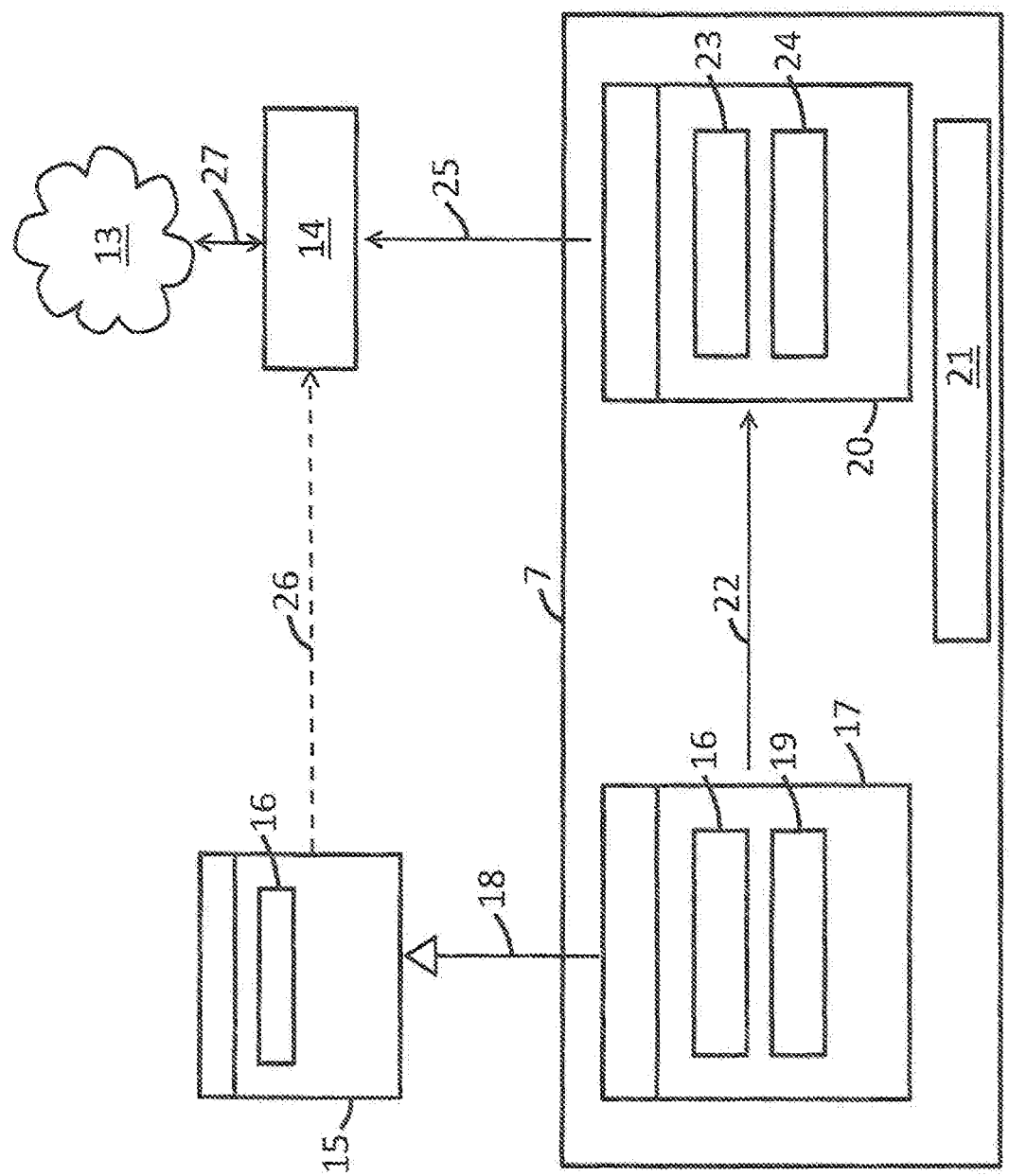

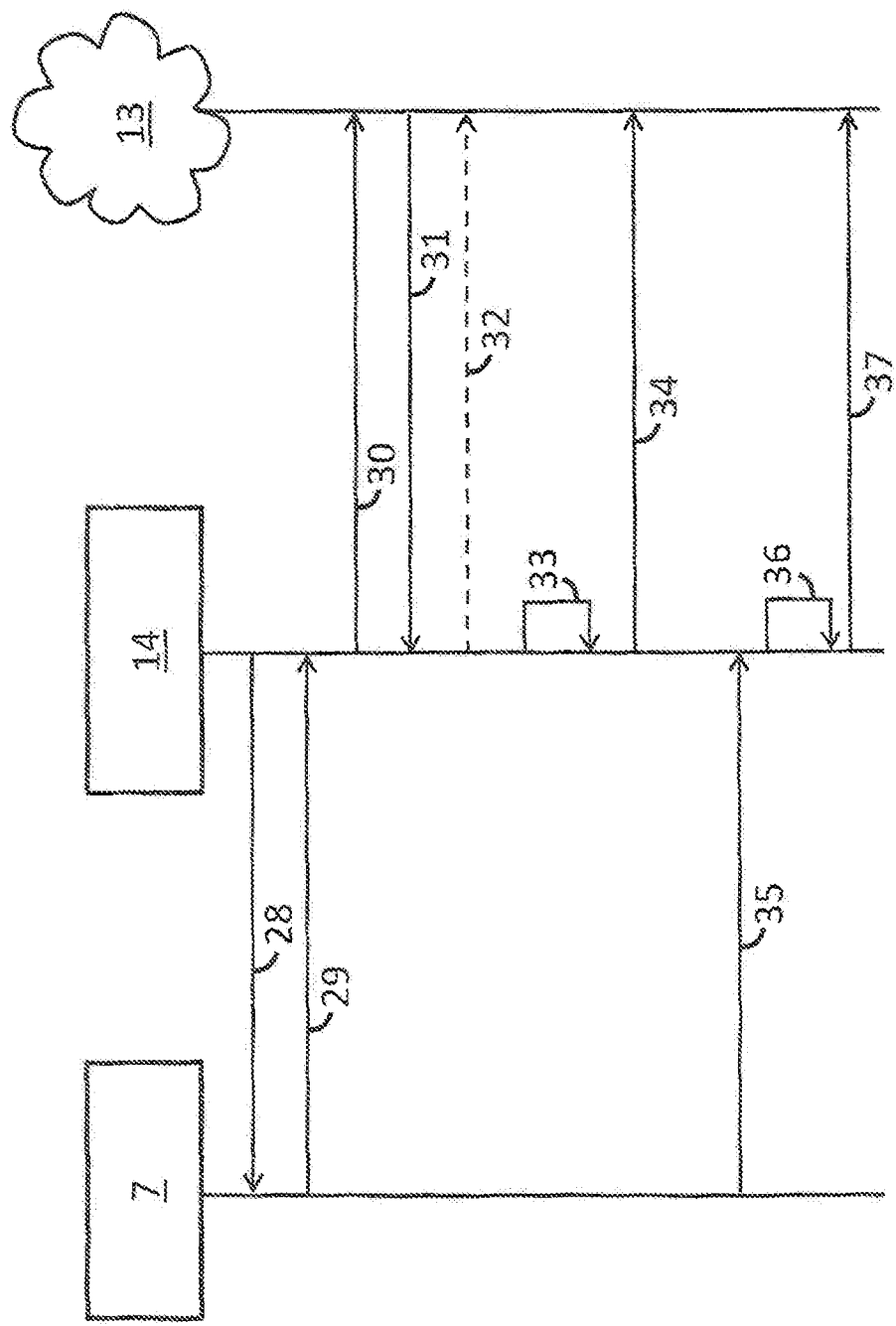

DATA STRUCTURE FOR THE TRANSFER OF DATA FROM A FIELDBUS NETWORK INTO A CLOUD

CROSS-REFERENCE TO RELATED APPLICATIONS

The present application is related to and claims the priority benefit of German Patent Application No. 10 2017 122 621.4, filed on Sep. 28, 2017 and International Patent Application No. PCT/EP2018/072522, filed on Aug. 21, 2018, the entire contents of which are incorporated herein by reference.

TECHNICAL FIELD

The invention relates to a fieldbus network, to a field device for a fieldbus network as well as to a connecting apparatus for a fieldbus network, wherein the connecting apparatus is designed to transfer data from the fieldbus network into the cloud. Moreover, the invention relates to a method for writing data from a fieldbus network into a cloud.

BACKGROUND

In automation technology, field devices are often applied, which serve for registering and/or influencing process variables. Examples of such field devices are fill level measuring devices, mass flow measuring devices, pressure- and temperature measuring devices, etc., which as sensors register the corresponding process variables, fill level, flow, pressure, and temperature.

For logging, documenting and later evaluation of the data occurring within a fieldbus system, the fieldbus system, or individual field devices of the fieldbus system, can be provided with access to a cloud. In this way, selected parameters of the field devices as well as, for example, data for monitoring the device state, can be written into the cloud. In such case, it is also possible to query individual parameters of the field device in fixed time intervals and to write such into the cloud.

SUMMARY

An object of the invention is to simplify data transfer from devices of a fieldbus network to the connecting apparatus and from there further into the cloud.

This object is achieved by the features set forth in claims 1, 16, 17 and 18.

Advantageous further developments of the invention are set forth in the dependent claims.

A fieldbus network corresponding to the forms of embodiment of the invention comprises a device and a connecting apparatus, which is designed to transfer data from the fieldbus network into a cloud. Installed in the device is a derived class, which is derived from a predetermined head class, wherein head attributes are established by the predetermined head class and additional attributes can be established by the derived class with reference to the device, wherein the device is designed based on the derived class to produce a data object for the data transfer to the cloud. The connecting apparatus is designed to receive the data object from the device, to convert at least a part of the data contained in the data object into a format of an interface of the cloud and to write the data into the cloud.

The predetermined head class provides a unified data structure for the data transfer from various devices of a fieldbus system to the connecting apparatus. Predetermined in the head class are especially the head attributes for the transfer of the data, which can comprise, for example, device identification data, such as e.g. manufacturer and serial number of a device. Derived from this predetermined head class are derived classes, which are then installed in the various devices. Since the derived classes are derived from the head class, they include the head attributes fixed in the head class. Additionally, the derived classes can include device specifically determinable, additional attributes. A derived class having a selection of additional attributes made for a particular device, or device type, is installed, for example, in a particular device and serves for producing a device specifically determined data object, which includes both the head attributes of the head class as well as also the additional attributes, which are established in the derived class. Because of the additional attributes, it is possible, for example, to provide device specifically a selection of parameters, whose values are to be transferred in the data object. At the device, the data required by the data object are read-out and embedded in the data object, which is then transferred from the device to the connecting apparatus. The connecting apparatus is designed to convert the data obtained from the devices into the format of the cloud and to write the converted data into the cloud.

Because of the derivation of the derived classes, and, thus, also the data objects, from a shared head class, a unification of the data transfer from the individual devices of the fieldbus network to the connecting apparatus is achieved. Especially, it can be achieved by suitable definition of the head class that in each data object there are transferred to the connecting apparatus head attributes, which can include, for example, device identification data, such as manufacturer and serial number. In this way, the connecting apparatus can associate the data objects with the different devices. Thus, in spite of the unification, the opportunity is provided to set by means of the additional attributes, device specifically and flexibly, those data and parameters, which are to be written from the device into the cloud. In this way, the user has the opportunity individually to establish per device, which parameters should be logged. In this way, different requirements, for example, requirements of quality monitoring or requirements of monitoring device health (asset health), can be taken into consideration.

A further advantage of the data structure provides that the retrieving and compiling of the data are largely shifted from the connecting apparatus to the devices. In the case of previous solutions, it was required that the connecting apparatus have device-specific information ready for a large number of device types, for example, information concerning at which addresses of the device the serial number and the name of the manufacturer were stored and at which addresses of the device relevant parameters were stored. Thus, it was required in the case of solutions of the state of the art to provide in a connecting apparatus a large amount of device-specific information, especially information concerning addressing and address space occupation of the individual device types. In the case of the data structure of the invention, the particular device produces the data object based on the derived class. The device, in particular the operating software of the device, is thus responsible for reading out from the various addresses of the device the data to be transferred in the data object, thus, for example, device identification data and parameter values, and to write such into the data object. The effort of downloading and compiling the required information can, thus, largely be undertaken by the particular device. The connecting apparatus is, for example, only responsible for converting the data contained in the incoming data objects into a format suitable for the interface to the cloud. The device-specific information previously provided in the connecting apparatus is no longer required. The connecting apparatus can, consequently, for example, be embodied significantly slimmed down as compared with the previous situation. Especially absent is the necessity in the connecting apparatus to update and care for device-specific information concerning addressing and address space occupation of the individual devices.

Preferably, the connecting apparatus is designed to receive the data objects of the various devices and to convert at least a part of the data contained in the data object into a format of an interface of the cloud, taking into consideration the structure predetermined by the head class. Preferably, the connecting apparatus has information concerning construction and structure of the data object. This information is, for example, derivable from the predetermined head class.

Preferably, the head attributes comprise at least one piece of meta data and control data for transferring data from the fieldbus network into the cloud. With the help of this meta data and/or control data, for example, the modalities for transferring data from the device into the cloud can be established. Thus, for example, it can be established with the assistance of the meta data and/or control data, how frequently and with what time separation data are to be transferred from a device to the connecting apparatus and from there further into the cloud.

Corresponding to forms of embodiment of the invention, installed in a field device for a fieldbus network is a derived class, which is derived from a predetermined head class, wherein head attributes are established by the head class and additional device specific attributes of the field device are established by the derived class. The field device is designed based on the derived class to produce and provide a data object, wherein the data object is transferable to a connecting apparatus of a fieldbus network and at least a part of the data contained in the data object is writable into the cloud by the connecting apparatus.

A connecting apparatus for a fieldbus network corresponding to the forms of embodiment of the invention is designed to transfer data from the fieldbus network into a cloud. The connecting apparatus is designed to receive a data object from at least one device of the fieldbus network, wherein the data object is produced based on a derived class installed in the respective device, wherein the derived class is derived from a predetermined head class. The connecting apparatus is designed to convert at least a part of the data contained in the data object into a format of an interface of the cloud and to write the data into the cloud.

A method corresponding to the forms of embodiment of the invention serves for writing data from a fieldbus network into a cloud. The fieldbus network includes at least one device, wherein a derived class is installed in at least one of the devices, wherein the derived class is derived from a head class, wherein head attributes are established by the head class and additional device specific attributes are established by the derived class. Moreover, the fieldbus network includes a connecting apparatus, which is designed to write data from the fieldbus network into the cloud. The method includes producing in a device a data object based on the derived class, wherein the data object includes head attributes and additional attributes. The method further includes transferring the data object from the device to the connecting apparatus. Moreover, the method includes converting in the connecting apparatus at least a part of the data of the data object into a format of an interface of the cloud, and writing the data into the cloud.

BRIEF DESCRIPTION OF THE DRAWINGS

The invention will now be explained in greater detail based on examples of embodiments shown in the drawing, the figures of the which show as follows:

FIG. 1 shows the construction of a fieldbus network having a connecting device for transferring data to a cloud;

FIG. 2 shows a data structure for producing data objects, which transfer to the connecting device data to be written from the field devices, gateway devices and other devices of the fieldbus network into the cloud; and FIG. 3 shows the flow of the data transfer between a field device, the connecting device and the cloud.

DETAILED DESCRIPTION

FIG. 1 shows a fieldbus system, which comprises a plurality of gateway devices and field devices. Connected to a fieldbus 1 is a field access device 2, which is connected via an Ethernet connection 3 with a host 4. The host 4 can have, for example, a frame application with drivers for parametering and configuring the gateway devices and field devices. In the case of the example illustrated in FIG. 1, there is connected to the fieldbus 1 a gateway device 5, which is connected via an additional fieldbus 6 with two field devices 7, 8. Moreover, connected to the fieldbus 1 is another gateway device 9, which via an additional fieldbus 10 is connected with the field devices 11 and 12. In the case of the fieldbus system shown in FIG. 1, it is provided that selected data can be written from the fieldbus system into a cloud 13. For this, there is connected to the fieldbus 1 a connecting device 14, which is designed to handle the communication with the cloud 13. Especially, the connecting device 14 is designed to write selected data from the fieldbus system into the cloud 13. The data storage area in the cloud 13 can serve, for example, to provide a quality documentation of production runs and, in this way, enable quality checking. Moreover, the data storage area in the cloud 13 can serve, for example, to create a database for subsequent technical or operational evaluation of the data.

In order to be able to write the data occurring in the field devices, gateway devices and other devices into the cloud 13, it is required that the connecting device 14 retrieve from the individual devices device identification data, such as, for example, manufacturer and serial number, as well as the required parameter values. The data occurring in the devices are written corresponding to this device identification data into associated entries of the cloud 13. For calling this information, it was previously required that extensive device-specific information for the different field device types and gateway types had to be held in the connecting device 14, in order to be able to query for the required data. Especially, it was necessary that there be present in the connecting device 14 for each device device-specific information concerning address space occupation of the device and especially the addresses of the device identification data. The keeping and especially also the care and updating of this device-specific information in the connecting device 14 for the plurality of present field devices and gateway devices required significant effort.

Shown in FIG. 2 is a structure of classes and, produced therefrom, data objects, for unifying and thereby simplifying the data transfer from the field devices, gateway devices and other devices of the fieldbus system to the connecting device 14. Shown in FIG. 2 as an example is the data transfer from the field device 7 to the connecting device 14, wherein the data transfer is conducted by means of a data object established for such purpose. Moreover, data objects from other field devices, gateway devices and other devices can be transferred to the connecting device 14.

The basic structure of the data objects used for the data transfer between at least a part of the devices of the fieldbus network and the connecting device 14 is established by means of a head class 15 defined for such purpose. The head class 15 includes one or more head attributes 16, which are transferred into the data object. The head attribute 16 can comprise, for example, device identification data, for example, information concerning manufacturer, device type and serial number of the device. Based on this device identification data, the connecting device 14 can insert a new entry into the cloud 13 or identify an already existing entry in the cloud 13. Then, the connecting device 14 writes the data contained in the data object into this entry.

The head attribute 16 can, moreover, contain data for the current state of the device, for example, data concerning a device state indicated according to a NAMUR recommendation. Moreover, the head attributes 16 predetermined in the head class 15 can comprise meta data and/or control data for transferring data objects from field devices, gateway devices and other devices to the connecting device 14. For example, it can be established with the aid of control- and/or meta data, in which time intervals data objects are to be transferred from the field devices and gateway devices to the connecting device 14. Moreover, by means of the control- and/or meta data, it can be established, for example, in which time intervals which parameter values are to be written from the connecting device 14 into the cloud 13. Moreover, the control- and/or meta data can contain, for example, data for syntax of the data transferred from the field device or gateway device to the connecting device 14.

From this head class 15 established once earlier for all devices or for a device type of the fieldbus network, derived classes can be derived, which can then be installed in different field devices, gateway devices and other devices of the fieldbus system. In the example illustrated in FIG. 2, there is installed in the field device 7 a derived class 17, which is derived from the head class 15. In such case, the derivation of the derived class from the head class 15 can occur, for example, according to the principles of object oriented programming, so that the derived class inherits the head attributes 16 of the head class 15. The inheritance between the head class 15 and the derived class 17 is indicated in FIG. 2 by the arrow 18. Thus, the derived class 17 installed in the field device 7 includes also the head attributes 16, which were established in the head class 15. Moreover, the derived class 17 has additional attributes 19, which are specifically for the particular field device or gateway device device.

The derived class 17 installed in the field device 7 serves as starting point for producing a data object 20, which is used for the data transfer between the field device 7 and the connecting device 14. Installed in the field device 7 is an operating software 21, which, based on the derived class 17, produces the data object 20 as an instance of the derived class 17, as indicated by the arrow 22. The data object 20 is instantiated during runtime. The data object 20 contains values 23 of the head attributes 16, thus, for example, device identification data such as the manufacturer and the serial number of the device. These values 23 are read-out by the operating software 21 of the field device 7 at the addresses of the field device 7 provided for such and placed in the data object 20. Moreover, the data object 20 contains values 24 for the additional attributes 19, which are likewise read-out by the operating software 21 from the addresses of the field device 7 and placed in the data object 20.

The additional attributes 19 comprise especially selected parameters of the particular device, which need to be transferred to the connecting device 14 and stored in the cloud 13. By means of the additional attributes 19, thus, the number of parameters is established, which are to be read-out by the device, transferred to the connecting device 14 and written into the cloud 13. This selection of parameters to be stored can be established individually per field device, gateway device or other device. The selection of parameters to be stored can, moreover, be made as a function of a configuration option of the device, such as, for example, "petroleum industry". Moreover, parameters can be written into the cloud 13, which are required, for example, for purposes of quality documentation. Moreover, parameters can be stored, which are required for monitoring condition, diagnosis and function checking of the particular device. For example, field devices, gateway devices and other devices, which support the Heartbeat Technology services, can write data concerning the condition of the particular device and diagnostic data in predetermined time intervals via the connecting device 14 into the cloud 13, in order, in this way, to be able to document and monitor the device state. This is important for quality assurance. For example, parameters can be stored in the cloud 13 at predetermined intervals, parameters which show a proper functioning of the field device, gateway device or other device. Moreover, for example, at predetermined intervals, such parameters can be stored, which historically document calibration of a field device, in order, for example, to be able to detect a drifting of the calibration based on the data stored in the cloud 13. The data stored in the cloud 13 are suitable as a basis for evaluation of "asset health", thus, device health. Especially, it can be ascertained from data stored in the cloud 13, when a new calibration or a replacement of a device is required.

The additional attributes 19 in the derived class 17 can, moreover, contain device specifically set control- and/or meta data, which, for example, establish, device specifically, the modalities, according to which the selected parameters in the data object are written into the cloud 13. For example, the device specifically set control- and/or meta data can give, in which time intervals which parameters are read-out by the device of the fieldbus network, transferred in the data object 20 to the connecting device 14 and written into the cloud 13. In such case, it is, for example, also possible to establish for different parameters, or different groups of parameters, individually the modalities of the storing in the cloud 13 and especially the time sequence of the storage procedures.

In the case of the solution shown in FIG. 2, the operating software 21 of the field device 7 is responsible for reading out the head attributes 16 as well as the additional attributes 19, as predetermined by the derived class 17, from the addresses of the field device 7 provided for such data and to write the so obtained values 23, 24 into the data object 20. Thus, it is no longer necessary to hold in the connecting device 14 device-specific information concerning address space occupations and especially, via the addresses, the device identification data. When the data transfer is conducted by means of the data object, the connecting device 14 is also no longer responsible for retrieving parameter values from the addresses of the field device 7 provided for such. Also, the parameter values are placed in the data object 20 by the operating software 21.

On the whole, this means that the responsibilities of the connecting device 14 for holding and caring for device-specific information concerning different field devices and gateway devices of the different manufacturers are significantly less. Especially, it is no longer required, for retrieving device identification data, to keep in the connecting device 14 detailed information concerning the addresses and address space occupations of the field devices, gateway devices and other devices. Rather, in the case of the solution shown in FIG. 2, the responsibility for the read-out of the required values of the head attributes as well as the selected parameter values is shifted to the operating software 21 of the field device 7, operating software which knows the address space occupation of the field device 7. Because of the operating software 21 of the field device, device attributes such as, for example, manufacturer and serial number, however, also data, for example, concerning device type or device state, can be read-out from the addresses of the address space of the field device 7 provided for such. Moreover, the operating software 21 is responsible for reading out from the appropriate addresses the parameter values predetermined by the additional attributes 19 and to write such into the data object 20. On the whole, thus, device specific processes are shifted by the data structure shown in FIG. 2 away from the connecting device 14 and to the particular field device, gateway device or other device.

The data object 20 created in the field device 7 is transferred as shown by the arrow 25 from the field device 7 to the connecting device 14. The connecting device 14 is designed to read out from the transferred data object 20 the values 23 of the head attributes as well as the values 24 of the additional attributes in the data object 20 and to convert these into a format suitable for the interface to the cloud 13. For accessing the data object 20, the connecting device 14 knows, for example, the structure of the data object 20, as obtained from the definition of the head class 15 and especially the definition of the head attributes 16. This information concerning the structure of the data object 20 is derivable, for example, from the definition of the head class 15, this being indicated in FIG. 2 by the dashed arrow 26. The connecting device 14 is able by means of this information to access specifically, for example, the head attributes 16 and the additional attributes 19 transferred in the data object 20.

Based on the device identification data transferred in the head attributes 16, the connecting device 14 can query the cloud 13, whether an entry already exists in the cloud 13 for this device identification data. Thereupon, a response is transferred from the cloud 13 to the connecting device 14, whether an entry for this device identification data already exists or not. In case an entry already exists, the parameter values transferred in the data object 20 can be written into the already existing entry. In case still no entry exists in the cloud 13 for the device identification data, the connecting device 14 can newly insert a corresponding entry and write the parameter values transferred in the data object 20 into this newly inserted entry. The data exchange between the connecting device 14 and the cloud 13 is shown in FIG. 2 by the double arrow 27. For writing data into the cloud 13, the connecting device 14 is designed to read out the corresponding values from the data object 20 and to convert them into the format of the particular interface to the cloud 13. This interface can be an API (Application Programming Interface) of the cloud 13, with which, for example, Web services provided by the cloud 13 can be contacted. The data can be written into the cloud 13, for example, as "key/value pairs", thus, as data pairs of data key and data value. In such case, the connecting device 14 is only embodied to convert the data contained in the data object 20 into a format suitable for the interface to the cloud 13. A deeper understanding of the meaning of the data obtained from the individual field devices and gateway devices is, in such case, not required in the connecting device 14. The connecting device 14 is, for example, only designed to convert the values 23, 24 transferred in the data object 20 according to predetermined rules into a format suitable for the cloud 13 and to write the results into the cloud 13. Also this contributes to being able to design the connecting device 14 to be smaller and less complex than in the case of previous solutions. However, the connecting device 14 can be designed, for example, to add to at least some pairs of data key and data value additional tags, which contain short explanations concerning meaning of the stored data, in order, in this way, to facilitate the later evaluation of the data stored in the cloud 13.

In case one or more of the data transferred in the data object 20 require a periodic storing of the value in the cloud 13, the data object 20 is transferred in predetermined time intervals from the field device 7 to the connecting device 14. The data contained in the data object 20 are converted by the connecting device 14 into corresponding data tuples and written into the cloud 13. In this way, it is possible, for example, to follow the time development of a parameter based on the data stored in the cloud 13.

However, there are within a fieldbus network frequently also one or more old devices, which are not capable of executing the data transfer schema shown in FIG. 2. On such old devices no derived class can be installed, which is derived from the head class 15. Such old devices are also not designed to provide a data object for the data transfer to the cloud. In order also to be able to retrieve data from these old devices and to write such into the cloud, data mapping specifications are created. These data mapping specifications establish, from which addresses of the old devices data are read-out by the connecting device 14 and how the read-out data are to be converted into the format of the cloud. Such data mapping specifications for a plurality of different old devices could be stored, for example, in the connecting device 14. This would mean, however, that such device-specific contents in the connecting device 14 must be cared for and updated. Alternatively thereto, data mapping specifications for a plurality different old devices could be stored in the cloud 13. When the connecting device 14 detects an old device in the fieldbus network, the connecting device 14 queries the cloud 13, whether a data mapping specification suitable for this old device exists in the cloud 13. In case a suitable data mapping specification is present in the cloud 13, the data mapping specification is downloaded from the cloud 13 to the connecting device 14. Corresponding to the data mapping specification, data are read-out from the old device by the connecting device 14. In such case, the data mapping specification provides, for example, address information for the old device and tells, at which addresses of the old device data are to be read out. The data read-out from the old device are then converted by the connecting device 14 into the format of the interface to the cloud 13 and written into the cloud 13. Thus, with the assistance of the predefined data mapping specifications, data can also be downloaded from old devices by the connecting device 14 and written into the cloud 13.

FIG. 3 shows the flow of the data transfer between the field device 7, the connecting device 14 and the cloud 13. First, the connecting device 14 transfers a message to the field device 7 in step 28, in order to retrieve the data object 20. Thereupon in step 29, the data object is 20 transferred from the field device 7 to the connecting device 14. The connecting device 14 reads device identification data from the data object 20, identification data such as, for example, manufacturer and serial number of the field device 7 and sends in step 30 a query to the cloud 13, whether an entry already exists for this device. From the response of the cloud 13 transferred from the cloud 13 to the connecting device 14 in step 31, the connecting device 14 learns, whether the data contained in the data object 20 can be written into an entry already existing for this field device 7 or whether a new entry should be created for the field device 7. In case no entry yet exists in the cloud 13, the connecting device 14 in step 32, shown with a dashed line, installs a new entry for the field device 7 in the cloud 13.

Thereupon, the connecting device 14 accesses the data values transferred in the data object 20, wherein the connecting device 14 preferably already knows the structure of the data object 20. The data values read-out from the data object 20 are converted by the connecting device 14 in step 33 into a format suitable for the interface to the cloud 13. In such case, the data can be transferred, for example, in the form of data pairs, or data tuples, from the connecting device 14 to the cloud 13. Each pair, or each tuple, includes a key and a data value. Additionally, the connecting device 14 can be embodied to add to the data pairs, data tuples, tags, which are also stored in the entry in the cloud 13 and facilitate identification of the stored data. In step 34, the data formated according to the interface definition of the cloud 13 are written into the entry of the cloud 13 belonging to the field device 7.

In case it is established in the data object 20 that one or more parameters contained in the data object 20 are to be periodically registered and written into the cloud 13, the data object must be transferred in regular time intervals from the field device 7 to the connecting device 14. In the case of the example illustrated in FIG. 3, after passing of a predetermined time span, in step 35, another data object of the field device 7 is transferred to the connecting device 14. In step 36, the parameter values contained in this data object are converted into the format of the interface of the cloud 13 and written in step 37 into the cloud 13. As time goes on, in predetermined time intervals, other data objects can be transferred from the field device 7 to the connecting device 14 and written by the connecting device 14 into the cloud 13.

The data stored in the cloud 13 can be used, for example, to document production runs, in order, in this way, to be able to prove also at later points in time that minimum quality requirements were fulfilled in the production. Moreover, the data stored in the cloud 13 can be used as basis for a more extensive analysis and data evaluation. For evaluation of the data, for example, a computer, in which a corresponding evaluating- or analytical software is installed, can be used to access the cloud 13 via the Internet, in order to retrieve and evaluate at least a part of the data stored there. Alternatively thereto, the evaluation of the data stored in the cloud 13 can occur via a Web application, into which the user logs in, in order then to perform by means of the Web application an evaluation of the data stored in the cloud 13. Another option is to integrate the software for data evaluation and data analysis into a separate, second cloud and to so design the second cloud that such second cloud can retrieve and evaluate the data stored in the first cloud 13.

The invention claimed is:

1. A fieldbus network comprising:
   a device; and
   a connecting apparatus, which is designed to transfer data from the fieldbus network into a cloud,
   wherein installed in the device is a derived class, which is derived from a predetermined head class, wherein head attributes are established by the predetermined head class and additional attributes are established by the derived class with reference to the device, wherein the device is designed based on the derived class to produce a data object for the data transfer to the cloud,
   wherein the connecting apparatus is designed to receive the data object from the device, to convert at least a part of the data contained in the data object into a format of an interface of the cloud, and to write the data into the cloud;
   wherein the connecting apparatus is designed to detect an old device, to perform a query of the cloud for a data mapping specification suitable for the old device and, in case such a data mapping specification for the old device is present in the cloud, to download the data mapping specification suitable for the old device from the cloud.

2. The fieldbus network as claimed in claim 1, wherein the connecting apparatus is designed to receive the data object from the device and to convert at least a part of the data contained in the data object into a format of an interface of the cloud, taking into consideration a structure predetermined by the head class.

3. The fieldbus network as claimed in claim 1, wherein the derived class inherits from the head class head attributes established in the head class.

4. The fieldbus network as claimed in claim 1, characterized by at least one of the following:
   the head attributes comprise device identification data of the device;
   the head attributes comprise information concerning manufacturer and serial number of the device;
   the head attributes comprise state data of the device;
   the head attributes comprise NAMUR data of the device;
   the additional attributes establish parameters of the device to be written into the cloud;
   the additional attributes comprise parameters for at least one of monitoring condition, diagnosis and function checking of the field device; and
   the additional attributes comprise regularly registered parameters of the device.

5. The fieldbus network as claimed in claim 4, characterized by at least one of the following:
   a selection of parameters of the device established in the data object by the additional attributes is freely determinable; and
   a selection of parameters of the device established in the data object by the additional attributes is selectable as a function of the device and a configuration option of the device.

6. The fieldbus network as claimed in claim 1, wherein the connecting apparatus is designed to retrieve a data object from the device, based on device identification data of the device contained in the head attributes to insert a data record into the cloud or to identify an existing data record and to write at least a part of the data contained in the data object into the data record in the cloud matching the device identification data.

7. The fieldbus network as claimed in claim 1, wherein the device includes at least one of the following: a field device; a gateway device; and a field access device.

8. The fieldbus network as claimed in claim 1, wherein the head attributes include at least one of meta data and control data for transferring data from the fieldbus network into the cloud.

9. The fieldbus network as claimed in claim 8, wherein it is determinable from the meta data and/or control data, in which time intervals the data object of the device is to be transferred to the connecting apparatus.

10. The fieldbus network as claimed in claim 1, wherein the data object includes for one or more of the additional attributes information, which tells, in which time intervals an additional attribute is to be queried from the device.

11. The fieldbus network as claimed in claim 1,
wherein the interface of the cloud is implemented conforming to the standard, Web Services;
wherein the connecting apparatus is designed to write data contained in the data object as pairs of key and value into the cloud; and
wherein the connecting apparatus is designed to provide at least a part of the data contained in the data object with tags and to write such as data keys and values together with the tags into the cloud.

12. The fieldbus network as claimed in claim 1, further comprising:
at least one old device in which no class derived from the predetermined head class is installed and which is not designed to provide a data object for the data transfer to the cloud,
wherein the connecting apparatus is designed to retrieve data from the at least one old device corresponding to at least one predefined data mapping specification and to convert the retrieved data into the format of the interface of the cloud.

13. The fieldbus network as claimed in claim 12, wherein a plurality of predefined data mapping specifications for old devices are stored in the cloud, wherein a data mapping specification predetermines how to retrieve data from the old device and how to convert such into the format of the interface of the cloud.

14. The fieldbus network as claimed in claim 4,
wherein the parameter values in the cloud are accessible and evaluatable via a Web application;
wherein the parameter values in the cloud are accessible and evaluatable via a second cloud; and
wherein the parameter values in the cloud are accessible and evaluatable using a computer via the Internet.

15. A field device for a fieldbus network, comprising:
a derived class, which is derived from a predetermined head class, having head attributes established by the head class and additional specific attributes of the field device established by the derived class,
wherein the field device is designed based on the derived class to produce and provide a data object, wherein the data object is transferable to a connecting apparatus of a fieldbus network and at least a part of the data contained in the data object is writable by the connecting apparatus into a cloud;
wherein the connecting apparatus is designed to detect an old device, to perform a query of the cloud for a data mapping specification suitable for the old device and, in case such a data mapping specification for the old device is present in the cloud, to download the data mapping specification suitable for the old device from the cloud.

16. A connecting apparatus for a fieldbus network and designed to transfer data from the fieldbus network into a cloud,
wherein the connecting apparatus is designed to receive a data object from at least one device of the fieldbus network, wherein the data object is produced based on a derived class installed in the device, wherein the derived class is derived from a predetermined head class, and wherein the connecting apparatus is designed to convert at least a part of the data contained in the data object into a format of an interface of the cloud and to write the data into the cloud;
wherein the connecting apparatus is designed to detect an old device, to perform a query of the cloud for a data mapping specification suitable for the old device and, in case such a data mapping specification for the old device is present in the cloud, to download the data mapping specification suitable for the old device from the cloud.

17. A method for writing data from a fieldbus network into a cloud, wherein the fieldbus network includes:
at least one device, wherein a derived class is installed in the at least one device, wherein the derived class is derived from a head class, wherein head attributes are established by the head class and additional device specific attributes are established by the derived class, and
a connecting apparatus, which is designed to write data from the fieldbus network into the cloud,
the method comprising:
producing in a device a data object based on the derived class, wherein the data object includes head attributes and additional attributes;
transferring the data object from the device to the connecting apparatus;
converting in the connecting apparatus at least a part of the data of the data object into a format of an interface of the cloud; and
writing the data into the cloud;
wherein the connecting apparatus is designed to detect an old device, to perform a query of the cloud for a data mapping specification suitable for the old device and, in case such a data mapping specification for the old device is present in the cloud, to download the data mapping specification suitable for the old device from the cloud.

* * * * *